(12) United States Patent
Galloway et al.

(10) Patent No.: US 8,417,888 B2
(45) Date of Patent: *Apr. 9, 2013

(54) METHOD AND SYSTEM FOR EXECUTION OF APPLICATIONS IN CONJUNCTION WITH RAID

(75) Inventors: William C. Galloway, Magnolia, TX (US); Ryan A. Callison, Magnolia, TX (US)

(73) Assignee: Pivot3, Inc., Spring, TX (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/914,559

(22) Filed: Oct. 28, 2010

(65) Prior Publication Data

US 2011/0040936 A1 Feb. 17, 2011

Related U.S. Application Data

(63) Continuation of application No. 12/490,810, filed on Jun. 24, 2009.

(60) Provisional application No. 61/133,534, filed on Jun. 30, 2008.

(51) Int. Cl.
*G06F 12/00* (2006.01)

(52) U.S. Cl.
USPC .......................................................... 711/114

(58) Field of Classification Search .................. None
See application file for complete search history.

(56) References Cited

U.S. PATENT DOCUMENTS

| | | | |
|---|---|---|---|
| 6,304,942 B1 | 10/2001 | DeKoning et al. | |
| 6,370,605 B1 | 4/2002 | Chong, Jr. | |
| 6,895,485 B1 | 5/2005 | DeKoning et al. | |
| 7,032,086 B2 | 4/2006 | Merchant | |
| 7,096,316 B1 | 8/2006 | Karr et al. | |
| 7,130,960 B1 | 10/2006 | Kano | |
| 7,366,837 B2 | 4/2008 | Corbett et al. | |
| 7,389,393 B1 | 6/2008 | Karr et al. | |
| 8,082,393 B2 | 12/2011 | Galloway | |
| 8,086,797 B2 | 12/2011 | Galloway | |
| 8,090,909 B2 | 1/2012 | Galloway | |
| 8,127,076 B2 | 2/2012 | Galloway | |
| 8,140,753 B2 | 3/2012 | Galloway et al. | |
| 8,145,841 B2 | 3/2012 | Galloway | |
| 8,176,247 B2 | 5/2012 | Galloway et al. | |

(Continued)

FOREIGN PATENT DOCUMENTS

CN 1747385 3/1996

OTHER PUBLICATIONS

Notice of Allowance for U.S. Appl. No. 12/490,916, mailed Jan. 9, 2012, 5 pgs.

(Continued)

*Primary Examiner* — Duc Doan
(74) *Attorney, Agent, or Firm* — Sprinkle IP Law Group

(57) ABSTRACT

Systems and methods are disclosed which allow various applications which may utilize a RAID system (or other types of applications) to be executed on the same set of computing devices which implement that RAID system. More particularly, in certain embodiments a virtualization layer may be executed on a data bank. A set of desired application programs may be executed using this virtualization layer, where the context for each instance of the applications, executing on the virtualization layer may be stored in a volume kept utilizing the RAID system.

12 Claims, 4 Drawing Sheets

U.S. PATENT DOCUMENTS

| | | | |
|---|---|---|---|
| 8,219,750 | B2 | 7/2012 | Galloway et al. |
| 8,239,624 | B2 | 8/2012 | Galloway et al. |
| 8,255,625 | B2 | 8/2012 | Galloway et al. |
| 8,261,017 | B2 | 9/2012 | Galloway et al. |
| 8,271,727 | B2 | 9/2012 | Galloway et al. |
| 8,316,180 | B2 | 11/2012 | Galloway et al. |
| 8,316,181 | B2 | 11/2012 | Galloway et al. |
| 2002/0035667 | A1 | 3/2002 | Brunning, III et al. |
| 2002/0069317 | A1 | 6/2002 | Chow et al. |
| 2002/0069318 | A1 | 6/2002 | Chow et al. |
| 2002/0087751 | A1 | 7/2002 | Chong, Jr. |
| 2003/0135709 | A1 | 7/2003 | Niles et al. |
| 2003/0159001 | A1 | 8/2003 | Chalmer et al. |
| 2004/0003173 | A1 | 1/2004 | Yao et al. |
| 2004/0153479 | A1 | 8/2004 | Mikesell et al. |
| 2004/0168018 | A1 | 8/2004 | Aasheim et al. |
| 2004/0177218 | A1 | 9/2004 | Meehan et al. |
| 2004/0221070 | A1 | 11/2004 | Ortega, III et al. |
| 2005/0015700 | A1 | 1/2005 | Hetzler et al. |
| 2005/0114350 | A1 | 5/2005 | Rose et al. |
| 2006/0010227 | A1 | 1/2006 | Atluri |
| 2006/0129559 | A1 | 6/2006 | Sankaran et al. |
| 2006/0242377 | A1 | 10/2006 | Kanie et al. |
| 2006/0248273 | A1 | 11/2006 | Jernigan, IV et al. |
| 2006/0248379 | A1 | 11/2006 | Jernigan, IV |
| 2006/0271734 | A1 | 11/2006 | Strange et al. |
| 2006/0277383 | A1 | 12/2006 | Hayden et al. |
| 2007/0073990 | A1 | 3/2007 | Snaman et al. |
| 2007/0094348 | A1* | 4/2007 | Scheidel et al. ............... 709/217 |
| 2007/0143541 | A1 | 6/2007 | Nichols et al. |
| 2007/0271434 | A1 | 11/2007 | Kawamura et al. |
| 2008/0104443 | A1 | 5/2008 | Akutsu et al. |
| 2008/0109601 | A1 | 5/2008 | Klemm et al. |
| 2008/0155191 | A1 | 6/2008 | Anderson et al. |
| 2008/0222633 | A1* | 9/2008 | Kami ............................... 718/1 |
| 2008/0256292 | A1 | 10/2008 | Flynn et al. |
| 2008/0270680 | A1 | 10/2008 | Chang |
| 2009/0006746 | A1 | 1/2009 | Sharma et al. |
| 2009/0172335 | A1 | 7/2009 | Kulkarni et al. |
| 2010/0106906 | A1 | 4/2010 | Galloway et al. |
| 2011/0022801 | A1 | 1/2011 | Flynn |
| 2012/0054431 | A1 | 3/2012 | Galloway et al. |
| 2012/0054432 | A1 | 3/2012 | Galloway et al. |
| 2012/0054433 | A1 | 3/2012 | Galloway et al. |
| 2012/0124286 | A1 | 5/2012 | Galloway et al. |
| 2012/0131383 | A1 | 5/2012 | Galloway et al. |
| 2012/0137069 | A1 | 5/2012 | Galloway et al. |
| 2012/0271997 | A1 | 10/2012 | Galloway et al. |
| 2012/0271998 | A1 | 10/2012 | Galloway et al. |
| 2012/0297136 | A1 | 11/2012 | Galloway et al. |
| 2012/0297137 | A1 | 11/2012 | Galloway et al. |

OTHER PUBLICATIONS

International Preliminary Report on Patentability issued for PCT Patent Application No. PCT/US2009/046470, mailed on Dec. 16, 2010, issued on Dec. 6, 2010, 8 pgs.

International Preliminary Report on Patentability issued for PCT Patent Application No. PCT/US2009/046471, mailed on Dec. 16, 2010, issued on Dec. 6, 2010, 8 pgs.

International Preliminary Report on Patentability issued for PCT Patent Application No. PCT/US2009/046473, mailed on Dec. 16, 2010, issued on Dec. 6, 2010, 7 pgs.

International Preliminary Report on Patentability issued for PCT Patent Application No. PCT/US2009/048570, mailed on Jan. 13, 2011, issued on Jan. 5, 2011, 8 pgs.

Office Action issued in U.S. Appl. No. 13/292,388, mailed Jan. 20, 2012, 6 pages.

Office Action issued for U.S. Appl. No. 13/291,311 mailed Feb. 1, 2012, 12 pages.

Office Action issued for U.S. Appl. No. 12/479,360 mailed Feb. 6, 2012, 8 pages.

Notice of Allowance issued for U.S. Appl. No. 12/490,810, mailed Feb. 16, 2012, 8 pages.

Office Action issued for U.S. Appl. No. 13/291,309, mailed Feb. 24, 2012, 10 pages.

Office Action issued for U.S. Appl. No. 13/366,069, mailed Mar. 13, 2012, 9 pages.

Notice of Allowance issued for U.S. Appl. No. 12/479,360, mailed Apr. 2, 2012, 4 pages.

Office Action issued for U.S. Appl. No. 13/358,306, mailed Apr. 4, 2012, 21 pages.

Supplemental Notice of Allowance for U.S. Appl. No. 12/490,916, mailed Apr. 9, 2012, 4 pages.

Notice of Allowance issued for U.S. Appl. No. 13/291,309, mailed Apr. 12, 2012, 5 pages.

Notice of Allowance issued for U.S. Appl. No. 13/291,311, mailed Apr. 13, 2012, 5 pages.

Office Action issued for U.S. Appl. No. 12/479,434, mailed May 11, 2011, 13 pgs.

International Preliminary Report on Patentability for PCT Patent Application No. PCT/US2009/048574, mailed May 12, 2011, 9 pgs.

Office Action issued for U.S. Appl. No. 12/479,360, mailed Jun. 7, 2011, 17 pgs.

Office Action issued for U.S. Appl. No. 12/479,319 mailed Jun. 22, 2011, 18 pgs.

Office Action issued for U.S. Appl. No. 12/479,403, mailed Jun. 24, 2011, 13 pgs.

Office Action issued for U.S. Appl. No. 12/479,377, mailed Jul. 29, 2011, 14 pgs.

Notice of Allowance issued in U.S. Appl. No. 12/479,434, mailed Sep. 21, 2011, 9 pgs.

Notice of Allowance issued in U.S. Appl. No. 12/479,403, mailed Sep. 30, 2011, 14 pgs.

Notice of Allowance issued in U.S. Appl. No. 12/479,319, mailed Oct. 5, 2011, 14 pgs.

Notice of Allowance issued in U.S. Appl. No. 12/479,394, mailed Oct. 5, 2011, 8 pgs.

Office Action issued in U.S. Appl. No. 13/224,936, mailed Oct. 12, 2011, 8 pgs.

Office Action issued in U.S. Appl. No. 12/490,810, mailed Oct. 18, 2011, 21 pgs.

Office Action issued in U.S. Appl. No. 12/479,360, mailed Oct. 25, 2011, 25 pgs.

John H. Hartman et al., "The Zebra Striped Network File System," ACM Transactions on Computer Systems, vol. 13, No. 3, Aug. 1995, pp. 274-310.

International Search Report and Written Opinion for International Patent Application No. PCT/US2009/046470 mailed on Jul. 21, 2009, 9 pgs.

International Search Report and Written Opinion for International Patent Application No. PCT/US2009/046473 mailed on Jul. 14, 2009, 8 pgs.

International Search Report and Written Opinion for International Patent Application No. PCT/US2009/048570 mailed on Aug. 5, 2009, 9 pgs.

International Search Report and Written Opinion for International Patent Application No. PCT/US2009/048574 mailed on Aug. 20, 2009, 10 pgs.

International Search Report and Written Opinion for International Patent Application No. PCT/US2009/046471 mailed on Dec. 28, 2009, 9 pgs.

Notice of Allowance issued for U.S. Appl. No. 12/479,377, mailed Nov. 18, 2011, 8 pgs.

Notice of Allowance issued for U.S. Appl. No. 13/224,936, mailed Dec. 14, 2011, 9 pgs.

Notice of Allowance issued for U.S. Appl. No. 13/358,306 mailed Aug. 24, 2012, 3 pages.

Notice of Allowance issued for U.S. Appl. No. 13/366,069 mailed Aug. 29, 2012, 4 pages.

Corrected Notice of Allowance issued for U.S. Appl. No. 13/291,311, mailed Jun. 21, 2012, 5 pages.

Supplemental Notice of Allowance issued for U.S. Appl. No. 13/291,309, mailed Jun. 22, 2012, 5 pages.

Supplemental Notice of Allowance issued for U.S. Appl. No. 13/291,309, mailed Aug. 2, 2012, 5 pages.

Supplemental Notice of Allowance issued for U.S. Appl. No. 13/291,309, mailed May 22, 2012, 5 pages.

Corrected Notice of Allowance issued for U.S. Appl. No. 13/291,311, mailed May 22, 2012, 5 pages.

Office Action issued for U.S. Appl. No. 13/364,439, mailed May 25, 2012, 21 pages.

Notice of Allowance issued for U.S. Appl. No. 13/366,069, mailed Jun. 8, 2012, 6 pages.

International Search Report and Written Opinion issued for PCT Application No. PCT/US2012/034701, mailed on Jul. 3, 2012, 12 pages.

European Search Report issued for European Patent Application No. 09 759 544.1, mailed on Apr. 5, 2012, 12 pages.

Notice of Allowance issued for U.S. Appl. No. 13/364,439, mailed Oct. 18, 2012, 6 pages.

Office Action and its English translation issued for Chinese Patent Application No. 200980125013.9, mailed Nov. 5, 2012, 20 pages.

* cited by examiner

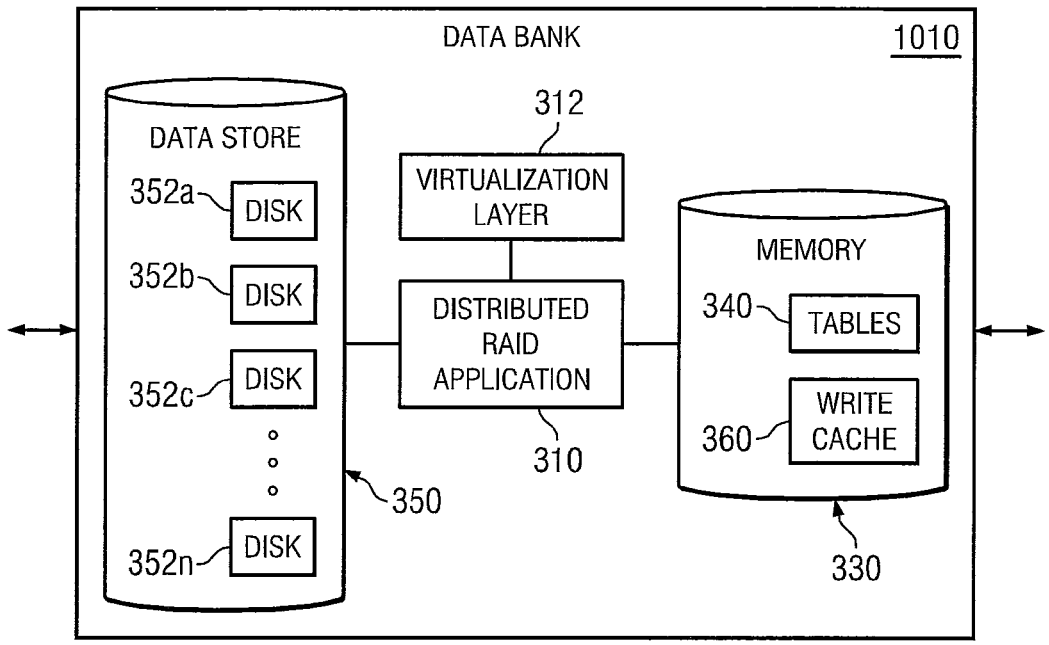
*FIG. 3*
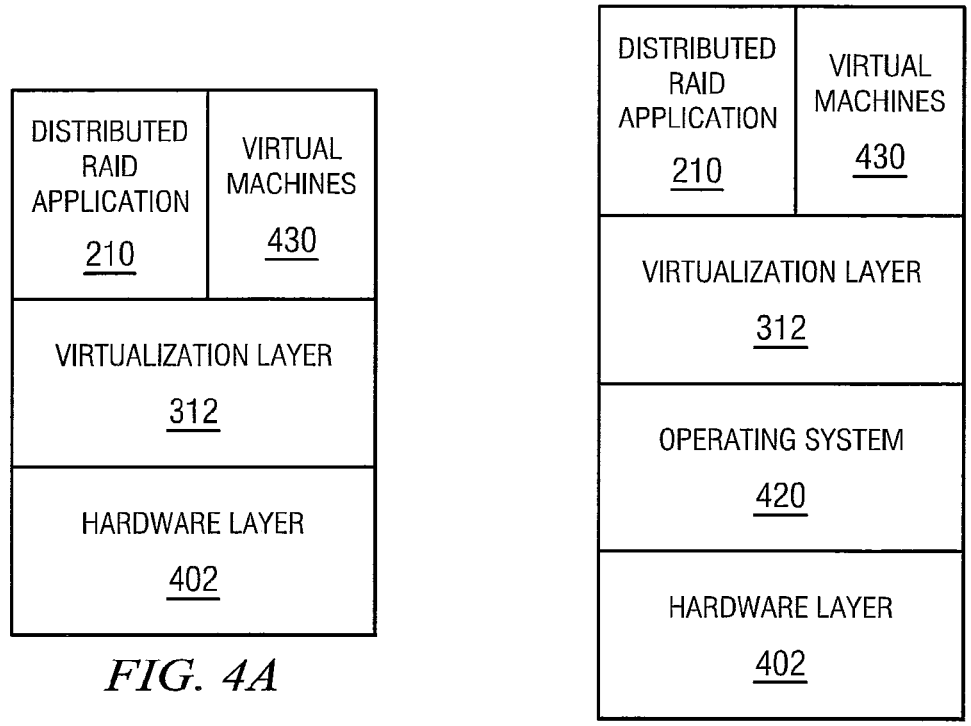
*FIG. 4A*
*FIG. 4B*

METHOD AND SYSTEM FOR EXECUTION OF APPLICATIONS IN CONJUNCTION WITH RAID

RELATED APPLICATIONS

This application is a continuation of U.S. patent application Ser. No. 12/490,810, entitled "Method and System for Execution of Applications in Conjunction with Distributed RAID" by inventors Galloway and Callison filed on Jun. 24, 2009, which in turn claims a benefit of priority under 35 U.S.C. §119 to provisional patent application No. 61/133,534 by inventor Galloway, entitled "Method and System for Execution of Applications in Conjunction with Distributed RAID" filed Jun. 30, 2008, which are hereby fully incorporated by reference herein for all purposes.

TECHNICAL FIELD

This invention relates generally to the use of storage devices. More particularly, embodiments of this invention relate to implementing RAID on storage devices and applications which may utilize this RAID functionality. Even more specifically, certain embodiments of this invention relate to implementing distributed RAID and one or more applications on the same set of computing devices.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy; security, etc. These techniques may, however, conflict with other competing constraints or demands imposed by the state or configuration of computing devices used to process or store this data.

One method for dealing with these tensions is to implement a Redundant Array of Independent Disks (RAID). Generally, RAID systems divide and replicate data across multiple hard disk drives (or other types of storage media), collectively referred to as an array, to increase reliability and in some cases improve throughput of computing devices (known as a host) using these RAID systems for storage. To a host then, a RAID array may appear as one or more monolithic storage areas. When a host desires to communicate (read, write, etc.) with the RAID system the host communicates as if the RAID array were a single disk. The RAID system, in turn, processes these communications to implement a certain RAID level in conjunction with such communications. These RAID levels may be designed to achieve some desired balance between a variety of tradeoffs such as reliability, capacity, speed, etc. For example, RAID (level) 0 distributes data across several disks in a way which gives improved speed and utilizes substantially the full capacity of the disks, but all data on a disk will be lost if the disk fails; RAID (level) 1 uses two (or more) disks which each store the same data, so that data is not lost so long as one disk survives. Total capacity of the array is substantially the capacity of a single disk and RAID (level) 5 combines three or more disks in a way that protects data against loss of any one disk; the storage capacity of the array is reduced by one disk.

It many cases, given the computing power of modern computing devices that a certain amount of redundancy may exist between computing devices implementing hosts which utilize RAID systems and computing devices implementing the RAID systems themselves. In addition to redundancy of physical components, hosts and RAID systems may also consume many of the same resources during operation. As both may require power, cooling, rack space, etc. Furthermore, as hosts and RAID systems communicate along individual paths, in order to implement a RAID system certain network components and pathways may need to be utilized. This situation can cause a number of undesirable problems including increased expenditure on hardware, communication bottlenecks, the need for a large amount of physical space to contain both hosts and RAID systems, etc.

Consequently, it is desired to substantially ameliorate these problems.

SUMMARY

Embodiments of systems and methods which allow various applications to be executed on the same set of computing devices which implement a RAID system are presented. Specifically; in one embodiment, to allow the RAID application to be executed in conjunction with other applications on the same set of computing devices a virtualization layer may be executed on a data bank. A set of desired application programs may be executed using this virtualization layer, where the context for each instance of the application executing on the virtualization layer may be stored in a volume kept utilizing the RAID system. These virtual machines (for example, application and any applicable contextual information stored in the volume) may then be executed in conjunction with the virtualization layer on a data bank. In this manner, a set of computing devices may be utilized to implement a RAID system and execute the applications which utilize such a distributed RAID system (among others). These types of applications may for example, include video surveillance applications, games, retail or banking applications, video streaming applications, content hosting applications, etc.

By executing these applications in conjunction with the computing devices which implement the RAID system a number of advantages may be achieved. First and foremost, a consolidation of physical resources may be achieved, reducing costs associated with both physical resources and the resources required to install, configure, utilize and maintain such resource as less space, power, cooling, spares, etc. may be needed. Furthermore, greater speed may be achieved in the implementation of both application and a distributed RAID system as communications occurring in conjunction with the use of the applications and the distributed RAID system may be fewer or may occur more quickly.

Additionally, levels of fault tolerance may be introduced through a configuration where instances of the application are saved as virtual machines and executed on a virtualization layer on a data bank implementing a distributed RAID system, as will be apparent in more detail after reviewing the remainder of the application. In brief this level of fault tolerance may result from the fact that each virtual machine (for example, instance of executing application which may be executed on a virtualization layer) is stored in a volume of the distributed RAID system may mean that the virtual machine may be recovered in the case of the failure of one of the data banks. Additionally, fault tolerance may be introduced as the virtual machine may be executed on the virtualization layer of any data bank, thus even if a single data bank fails each virtual machine may still be executed.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 3 is a block diagram of one embodiment of a data bank.

FIG. 4A is block diagram of an example of one embodiment of an architecture for a data bank.

FIG. 4B is block diagram of an example of one embodiment of an architecture for a data bank.

DETAILED DESCRIPTION

Figure 1:
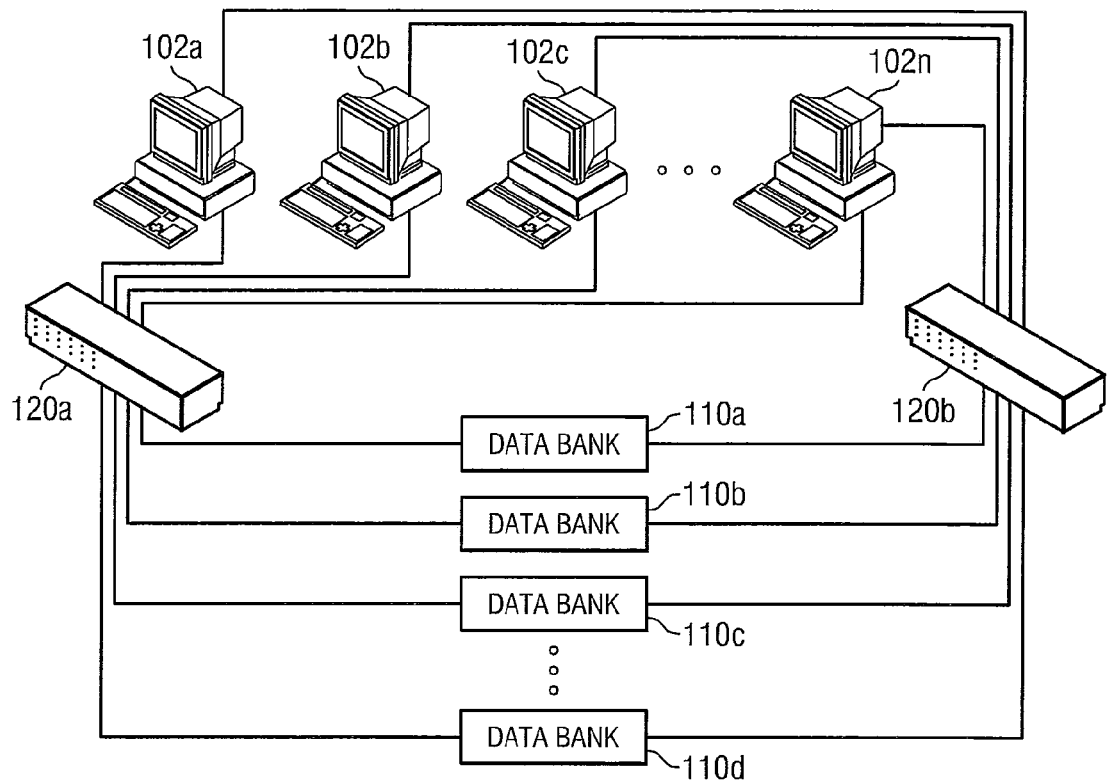
FIG. 1 is a block diagram of one embodiment of an architecture employing a distributed RAID system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments is described herein. One embodiment can include one or more computers communicatively coupled to a network.

As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples illustrations includes, but is not limited to: "for example", "for instance", "e.g.", "in one embodiment".

This application is related to U.S. patent application Ser. No. 12/479,319 entitled "Method and System for Distributed RAID Implementation", filed Jun. 5, 2009, by Galloway et al.; Ser. No. 12/479,360, entitled "Method and System for Data Migration in a Distributed RAID Implementation" by Galloway et al., filed on Jun. 5, 2009; Ser. No. 12/479,403, entitled "Method and System for Distributing Commands to Targets" by Galloway et al., filed Jun. 5, 2009; Ser. No. 12/479,377, entitled "Method and System for Initializing Storage in a Storage System" by Galloway et al., filed Jun. 5, 2009; Ser. No. 12/479,434, entitled "Method and System for Rebuilding Data in a Distributed RAID System" by Galloway et al., filed Jun. 5, 2009; and Ser. No. 12/479,394, entitled "Method and System for Placement of Data on a Storage Device" by Galloway et al., filed Jun. 5, 2009, and Ser. No. 12/490,916, entitled "Method and System for Protecting Against Multiple Failures in a RAID System" by Galloway et al.; all of which are incorporated fully herein by reference A brief discussion of context particularly with respect to data storage may now be helpful. As discussed above, RAID systems divide and replicate data across multiple hard disk drives (or other types of storage media), collectively referred to as an array, to increase reliability and in some cases improve throughput of computing devices (known as a host) using these RAID systems for storage. However, current implementations of RAID may have a variety of problems.

In particular, certain of these problems may stem from limitations imposed by the architecture of these RAID systems, such as the fact that in many instances all communications with a RAID system must be addressed to a single server which controls and manages the RAID system. This architecture may lead to redundancy in the physical components which comprise hosts which utilize a RAID system and the computing devices used to implement the RAID system. In addition to redundancy of physical components, hosts and RAID systems may also consume many of the same resources during operation. As both hosts and RAID systems may require power, cooling, rack space, etc. This situation can cause a number of undesirable problems including increased expenditure on hardware, communication bottlenecks, the need for a large amount of physical space to contain both hosts and RAID systems, etc.

It will be helpful to illustrate certain embodiments of the present invention with respect to a particular RAID system, it should be noted however, that the particular RAID system with which certain embodiments are illustrated places no limitations on the applicability or use of other embodiments of the invention, and that such embodiments may be usefully employed in any of a variety of contexts, including other types of RAID systems or other types of storage systems altogether.

With that being said, certain embodiments may be usefully illustrated with respect to a distributed RAID system, where a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system. By coordinating the implementation of a level of RAID in conjunction with a volume by storing both data of the volume and data associated with the implementation of RAID on multiple data banks using similar distributed RAID applications executing on each of those data banks a number of advantages may be achieved. Namely, different storage volumes may be allotted, with one or more of the volumes implemented in conjunction with different RAID levels. Moreover, as the coordination of storage and the implementation of RAID across the data banks are accomplished using substantially identical distributed RAID applications, in many cases standard or off-the-shelf hardware, such as standard x86 based servers and storage media may be utilized. Many other advantages may also be realized utilizing embodiments presented herein or other embodiments, and such advantages, which may or may not be pointed out in particular detail, will be realized after reading this disclosure.

Turning now to FIG. 1, a block diagram of an architecture for a system which utilizes one embodiment of a distributed RAID system is depicted. Distributed RAID system 100 includes a set of data banks 110, each data bank 110 communicatively coupled to both of switches 120. Each of switches 120 is also communicatively coupled to each host 102, such that a host 102 may communicate with each data bank 110 through a set of paths corresponding to a particular data bank 110, each path comprising one of the switches 120.

The communicative coupling between data banks 110, switches 120 and hosts 102 may be accomplished using almost any transport medium (either wired or wireless) desired, including Ethernet, SCSI, iSCSI, Fibre Channel, serial attached SCSI ("SAS"), advanced technology attachment ("ATA"), serial ATA ("SATA") or other protocols known in the art. Furthermore, the communicative coupling may be implemented in conjunction with a communications network such as the Internet, a LAN, a WAN, a wireless network or any other communications network known in the art.

In one embodiment, then, using a commands protocol, such as iSCSI, SCSI, etc., hosts 102 may communicate with data banks 110 to manipulate data. More particularly, each of data banks 110 comprises storage media (as will be explained in more detail later on herein). Collectively, the storage media in data banks 110 may be virtualized and presented to hosts 102 as one or more contiguous blocks of storage, storage devices, etc. For example, when the iSCSI protocol is utilized the storage media in data banks 110 may be presented to hosts 102 as a SCSI target with, in one embodiment, multiple ports.

Thus, during operation, in one embodiment a host 102 (or a user at a host 102 or interfacing with data bank 110) may request the creation of a volume and specify a level of RAID to be implemented in conjunction with that volume. Data associated with that volume and the implementation of the desired level RAID in association with that volume is stored across data banks 110. The hosts 102 may then access this volume using logical address corresponding to the volume or a portion thereof. In this manner, hosts 102 can utilize created volumes of storage and fault tolerance can be achieved in conjunction with these volumes substantially invisibly to hosts 102.

Figure 2A:
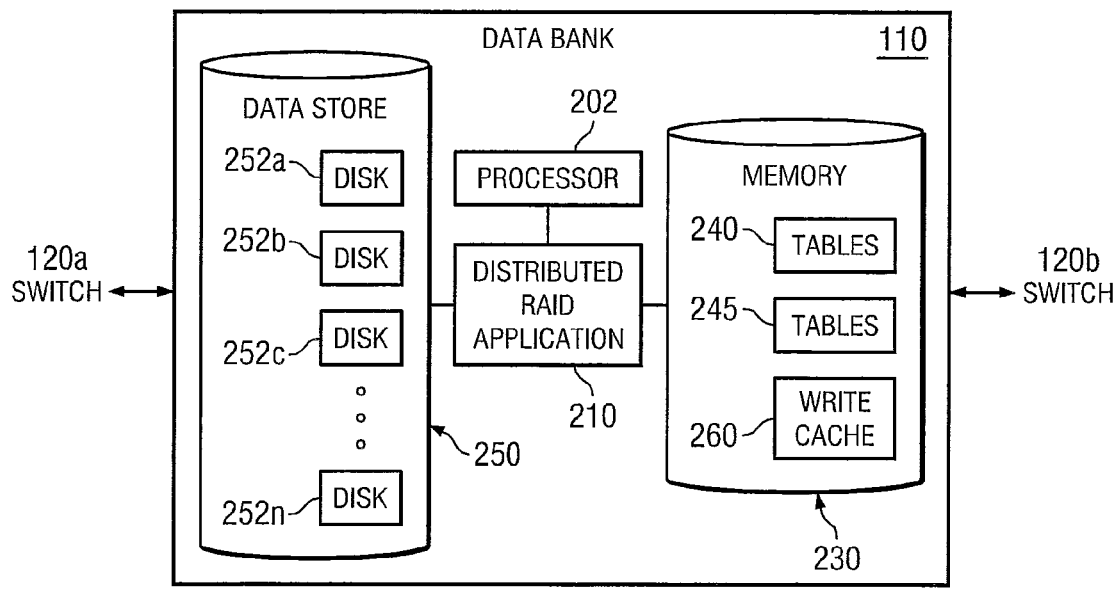
FIG. 2A is a block diagram of one embodiment of a data bank.

The virtualization of storage and the implementation of RAID utilizing data banks 110 may be better understood with reference to FIG. 2A which depicts a block diagram of one embodiment of a data bank 110 computer operable to implement distributed RAID. Here, data bank 110 comprises a data store 250, and a processor 202 operable to execute instructions stored on a computer readable medium, where the instructions are operable to implement distributed RAID application 210. Distributed RAID application 210 may periodically issue heartbeat communications to distributed RAID applications 210 on other data banks 110 to determine if there has been a fault with respect to that data bank 110. If the distributed RAID application 210 determines that another data bank 110 is experiencing a fault it may set one or more fault flags corresponding to that data bank 110. Using these fault flags for each distributed RAID application 210 on each data bank 110 a particular distributed RAID application 210 may determine if a certain data bank 110 is faulty.

Distributed RAID application 210 may also have access (for example, to read, write, issue commands, etc.) to data store 250 comprising one or more storage media, which may for example be disks 252 operating according to almost any protocol known, such as SATA, PATA, FC, etc. where each of the disks 252 may, or may not, be of equal size. Distributed RAID application 210, executing on each of data banks 110 can allow the allocation of and use of volumes using data stores 250 across data banks 110 and the implementation of RAID in conjunction with these volumes utilizing a set of global tables 240 shared between data banks 110, a set of local tables 245 and write cache 260, all of which may be stored in a memory 230 (which may be data store 250 or another memory altogether).

Figure 2B:
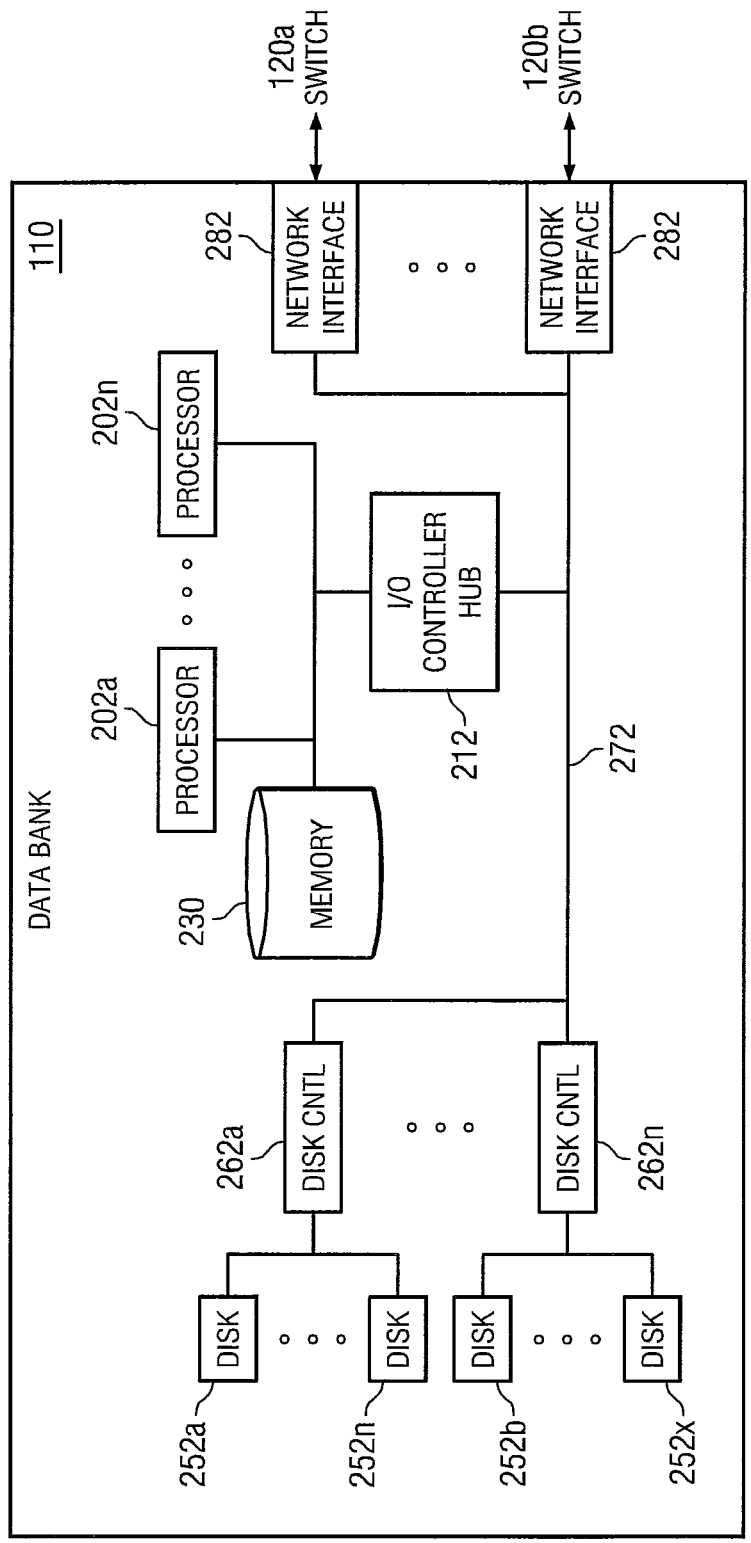
FIG. 2B is a block diagram of one embodiment of an architecture for a data bank.

FIG. 2B depicts a block diagram of one embodiment of a hardware architecture which may be used to implement data bank 110 computer operable to implement distributed RAID. In this architectural example, data bank 110 comprises one or more processors 202 which may adhere to the Intel x86 architecture or some other architecture altogether and a memory 230 coupled through a bus to I/O controller hub 212, which in one embodiment may be a southbridge chip or the like. The I/O controller hub 212 may, in turn, be coupled to and control a bus 272 such as a PCI-X bus, PCI-express bus, etc. Coupled to this bus 272 are one or more disk controllers 262 such as, for example, an LSI 1068 SATA/SAS controller. Each of these disk controllers 262 is coupled to one or more disks 252, where collectively these disks 252 may comprise data store 250. Additionally, one or more network interfaces 282 may also be coupled to bus 272. These network interfaces 282 may be network interfaces (such as Ethernet, etc.) which are included on motherboards, may comprise one or more network interface cards configured to interface via one or more protocols such as Ethernet, fibre channel, etc. or may be some other type of network interface such that data bank 110 may communicate with switched 120 through these network interfaces 282.

It just so happens that in some embodiments, components of computing devices which are used to implement data banks 110 may have more (or may be built to have more) computing power than may be needed to execute distributed RAID application 210. In many cases, then the computing device (for example, processor, cache, memory, boards, etc.) used to implement data bank 110 may have unutilized computing power when used to execute only distributed RAID application 210. What is desired, then, is to utilize this excess computing power to execute applications which execute on host 102 and utilize distributed RAID application 210. This may be problematic, however, as in many cases there may be a wide variety of these applications executing on different hosts 102, where each of the hosts may execute differing operating systems, the application may be configured to execute on only one type of operating system, etc.

Therefore, attention is now directed to systems and methods of the present invention which allow various applications which may utilize a distributed RAID system (or other types of applications) to be executed on the same set of computing devices which implement that distributed RAID system. To allow the distributed RAID application to be executed in conjunction with other applications on the same set of computing devices a virtualization layer may be executed on a data bank. A set of desired application programs may be executed using this virtualization layer, where the context for each instance of the application executing on the virtualization layer may be stored in a volume kept utilizing the distributed RAID system. These virtual machines (for example, application and any applicable contextual information stored in the volume) may then be executed in conjunction with the virtualization layer on any one of the data banks. In this manner, a set of computing devices may be utilized to implement a distributed RAID system and execute the applications which utilize such a distributed RAID system (among others). These types of applications may for example, include video surveillance applications, games, retail or banking applications, video streaming applications, content hosting applications, etc.

By executing these applications in conjunction with the computing devices which implement the distributed RAID system a number of advantages may be achieved. First and foremost, a consolidation of physical resources may be achieved, reducing costs associated with both physical resources and the resources required to install, configure, utilize and maintain such resource as less space, power, cooling, spares, etc. may be needed. Furthermore, greater speed may be achieved in the implementation of both application and a distributed RAID system as communications occurring in conjunction with the use of the applications and the distributed RAID system may be fewer or may occur more quickly.

Additionally, levels of fault tolerance may be introduced through a configuration where instances of the application are saved as virtual machines and executed on a virtualization layer on a data bank implementing a distributed RAID system, as will be apparent in more detail after reviewing the remainder of the application. In brief, this level of fault tolerance may result from the fact that each virtual machine (for example, instance of executing application which may be executed on a virtualization layer) is stored in a volume of the distributed RAID system may mean that the virtual machine may be recovered in the case of the failure of one of the data banks. Additionally, fault tolerance may be introduced as the virtual machine may be executed on the virtualization layer of any data bank, thus even if a single data bank fails each virtual machine may still be executed.

With reference now to FIG. 3, of one embodiment of a data bank which may implement a distributed RAID system and allow execution of various applications is depicted. Here, data bank 1110 comprises a data store 350, and a processor (not shown) or other hardware operable to execute instructions stored on a computer readable medium. This hardware may, for example, be an x86 platform or the like.

Instructions stored on a computer readable medium may be operable to implement virtualization layer 312 and distributed RAID application 310. Virtualization layer 312 may be one of, for example, Containers by Sun Microsystems, Linux KVM, Linux VServer, Oracle VM, Virtual PC, Virtual Server by Microsoft, PowerVM by IBM Logical Domains by Sun Microsystems, VMware Server, etc. or any other type of virtualization or emulation machine application, as are known in the art. Distributed RAID application 310 may have functionality similar to that described above. To aid in the implementation of one or more of these have tables 340 in memory 330 may track such information as which volumes stored by the distributed RAID system are virtual machines and which data bank 110 is assigned to a particular virtual machine.

Figure 4C:
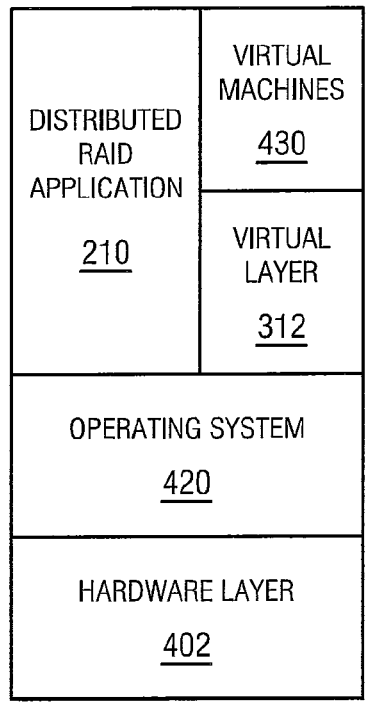
FIG. 4C is block diagram of an example of one embodiment of an architecture for a data bank.

Briefly referring to FIGS. 4A, 4B and 4C then, three embodiments of architectures of data banks 1010 with virtualization layers are depicted. It will be noted that other embodiments of such architectures are possible and may be utilized. In FIG. 4A, virtualization layer 312 may exist on hardware layer 402 such that distributed RAID application 310 and virtual machines 430 (applications and their corresponding contexts) may be executed on virtualization layer 312. FIG. 4B depicts an embodiment where an operating system 420 (for example, Windows, Solaris, MacOS, etc.)

may execute on hardware layer 402 with virtualization layer 312 executing on the operating systems 420 such that distributed RAID application 310 and virtual machines 430 (applications and their corresponding contexts) may be executed on virtualization layer 312. FIG. 4C depicts an embodiment in which an operating system 420 may execute on hardware layer 402. Distributed RAID application 310 and a virtualization layer 312 may execute on the operating system 420. Virtual machines 430 may then be executed on virtualization layer 312.

Figure 5:
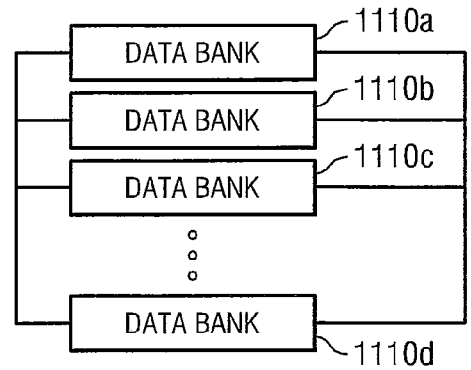
FIG. 5 is a block diagram of one embodiment of an architecture employing a distributed RAID system on which other applications may be executed.

Thus, one embodiment of a system which may be operable to both implement a distributed RAID system using a set of data banks 1110 and execute one or more applications which may utilize this distributed RAID system on one or more of the same data banks 1110 is depicted in FIG. 5.

Figure 6:
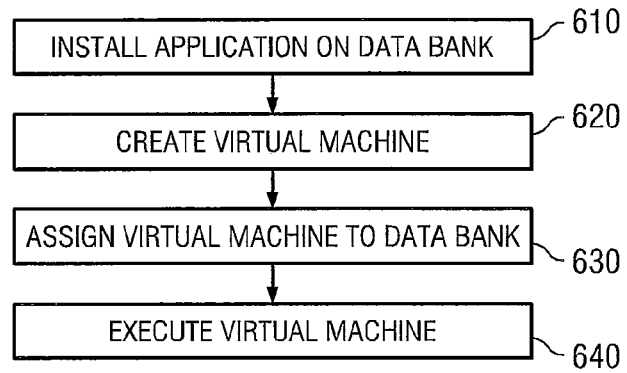
FIG. 6 is a flow diagram for one embodiment of executing of applications on a distributed RAID system.

Moving to FIG. 6, one embodiment of a method for executing one or more applications on a data bank 1110 which also is executing a distributed RAID application 310 is depicted. At step 610, an application may be executed on the virtualization layer 312 of a data bank 1110. This installation process may, at step 620, create a virtual machine operable to when executed by the virtualization layer 312 execute the application in association with a particular context. More specifically, in one embodiment a volume may be created using distributed RAID application 310 where the application may be stored in that volume along with the context resulting from execution of that application for a certain amount of time on virtualization layer 312.

Figure 7:
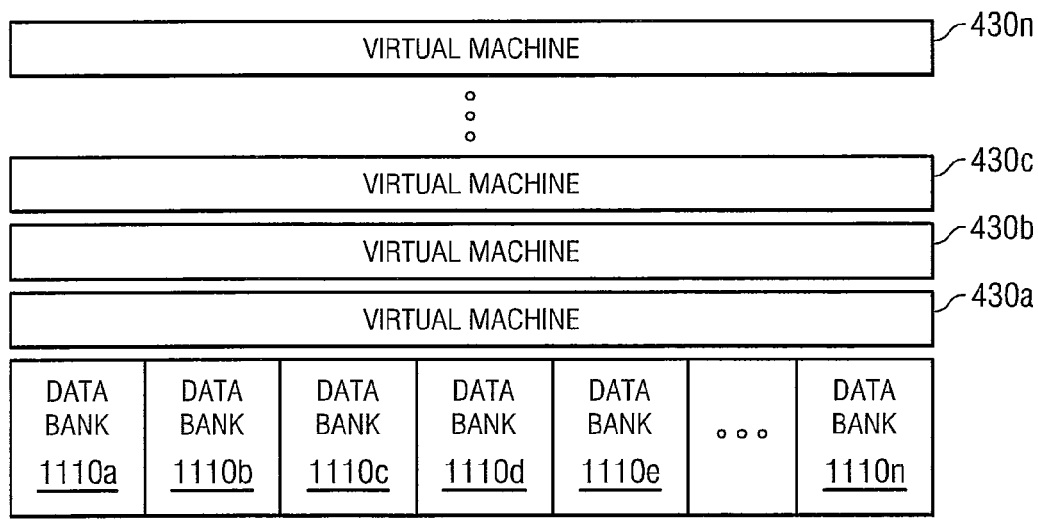
FIG. 7 is a block diagram depicting one embodiment the storage of virtual machines in conjunction with a distributed RAID system.

This is depicted more clearly in FIG. 7 which depicts how each of virtual machines 430 may be a volume stored in the data stores 350 of each of data banks 1110. Each of the virtual machines may correspond to one installed instance of an application and an associated context such that virtual machine 430 may executed on virtualization layer 312 to run the application with the corresponding context.

Returning to FIG. 6, once the application is installed and the virtual machine created, in one embodiment, at step 630 the virtual machine comprising an instance of the application may be assigned to execute on a particular data bank 1110 and thus the virtual machine may execute at step 640 on the virtualization layer 312 of the assigned data bank 1110.

At any point if it is desired to stop execution of this virtual machine for any reason, the virtual machine may be stored such that execution of the virtual machine may be resumed later from the same point by the particular data bank 1110 to which the virtual machine is assigned. This storing may entail the storing the context in the virtual machine (the volume corresponding to the virtual machine) if needed.

It will be noted that as each virtual machine 430 is stored across data banks 1110 comprising the distributed RAID system, the data bank 1110 to which the virtual machine is assigned may access and execute each virtual machine. Additionally, it will be noted that a level of RAID may have been implemented in conjunction with the storage of that virtual machine as that virtual machine may be stored in a volume associated with distributed RAID application 310. Consequently, as discussed earlier by executing, applications on data banks 1110 using virtual machines stored as volumes managed by distributed RAID application 310 fault tolerance may be achieved inherently through the architecture of the distributed RAID system.

More specifically, in one embodiment, as each data bank 1110 may access any virtual machine and each virtual machine 430 may be stored in conjunction with a level of RAID even if a particular data bank 1110 was to fail the application may still be able to be executed as all data pertaining to any virtual machine may still be accessible by the remaining operating data banks 1110. In fact, in one embodiment, if a particular databank fails 1110 the failed data bank 1110 may be detected and each VM assigned to the failed data bank 110 may be substantially automatically assigned to another operational data bank 1110 such that all VMs which were executing on the failed data bank 1110 will now be executing on another data bank 1100. This assignment may be done randomly or based upon one or more criteria, such as the number of VMs assigned to each data bank 1110, etc. By automatically reassigning VMs of a failed data bank 1110 down time may be minimize in addition to giving the application some level of fault tolerance.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for implementing RAID, comprising:
a first computing device coupled to a set of hosts, including:
    a processor;
    a data store for storing data associated with a volume;
    a non-transitory computer readable medium comprising instructions executable by the processor for:
        executing an application program on the first computing device, wherein the application program is a virtual machine and the application program is executed using a virtualization layer on the first computing device; and
        implementing a RAID application in association with the first computing device and one or more additional computing devices, the RAID application operable to:
    receive a command corresponding to a first segment of a set of segments of the
    volume, wherein the command was issued by the application program and the set of segments and redundancy data corresponding to a RAID level implemented in conjunction with the volume are stored in association with the first computing device and the one or more additional computing devices according to a random permutation; and
    determine if the first segment is stored in association with the first computing device and if the first segment is stored in association with the first computing device execute the command with respect to the first segment stored in association with the first computing device, and if the first segment is not stored in association with the first computing device, determine a second computing device of the one or more additional computing devices that is associated with the first segment and forward the first command to the second computing device.

2. The system of claim 1, wherein the virtual machine corresponds to a second volume, the second volume stored in association with the computing device.

3. The system of claim 2, wherein the computer readable medium is coupled to a RAID controller.

4. The system of claim 3, wherein the RAID controller is operable to manage the virtual machine.

5. A method for RAID implemented in conjunction with various applications programs on a computing device having a processor, comprising:
    establishing a first volume on a first computing device, where the first volume comprises a set of segments and the set of segments are stored in association with the first computing device and one or more additional computing devices according to a random permutation;
    establishing a second volume in association with the computing device wherein the second volume corresponds to an application program stored as a virtual machine;
    executing the application program on the first computing device using a virtualization layer;
    implementing a RAID level in conjunction with the volume, wherein implementing the RAID level comprises storing a set of redundancy segments on the first computing device and the one or more additional computing devices;
    receiving a command corresponding to a first segment of the set of segments of the volume, wherein the command was received from the application program executing on the first computing device; and
    determining if the first segment is stored in association with the first computing device and if the first segment is stored in association with the first computing device executing the command with respect to the first segment, wherein the first command is executed on the first computing device, and if the first segment is not stored in association with the first computing device, determine a second computing device of the one or more additional computing devices that is associated with the first segment and forward the first command to the second computing device.

6. The method of claim 5, wherein the virtual machine corresponds to a second volume, the second volume stored in association with the computing device.

7. The method of claim 6, wherein the method is implemented on a RAID controller.

8. The method of claim 7, wherein the RAID controller is operable to manage the virtual machine.

9. A non-transitory computer readable medium comprising computer executable instructions for implementing RAID in conjunction with various applications programs, the computer instructions executable for:
    establishing a first volume on a first computing device, where the first volume comprises a set of segments and the set of segments are stored in association with the first computing device and one or more additional computing devices according to a random permutation;
    establishing a second volume in association with the computing device wherein the second volume corresponds to an application program stored as a virtual machine;
    executing the application program on the first computing device using a virtualization layer;
    implementing a RAID level in conjunction with the volume, wherein implementing the RAID level comprises storing a set of redundancy segments on the first computing device and the one or more additional computing devices;
    receiving a command corresponding to a first segment of the set of segments of the volume, wherein the command was received from the application program executing on the first computing device; and
    determining if the first segment is stored in association with the first computing device and if the first segment is stored in association with the first computing device executing the command with respect to the first segment, wherein the first command is executed on the first computing device, and if the first segment is not stored in association with the first computing device, determine a second computing device of the one or more additional computing devices that is associated with the first segment and forward the first command to the second computing device.

10. The computer readable medium of claim 9, wherein the second volume is stored on the computing device.

11. The computer readable medium of claim 10, wherein the computer readable medium is coupled to a RAID controller.

12. The computer readable medium of claim 11, wherein the RAID controller is operable to manage the virtual machine.

* * * * *